United States Patent [19]

Germer

[11] 3,708,039
[45] Jan. 2, 1973

[54] BRAKE SPRING APPARATUS

[76] Inventor: John A. Germer, c/o The Budd Company, 2450 Hunting Park Avenue, Philadelphia, Pa. 19132

[22] Filed: Dec. 3, 1970

[21] Appl. No.: 94,715

[52] U.S. Cl. .............................. 188/62, 188/196 M
[51] Int. Cl. ................................................ B61k 7/02
[58] Field of Search ................ 188/62, 166, 196 M

[56] References Cited

UNITED STATES PATENTS

| 823,772 | 6/1906 | Fitch | 188/62 |
| 1,611,200 | 12/1926 | Kellenberger | 188/62 |
| 2,263,244 | 11/1941 | McGowan et al. | 188/62 |
| 2,904,133 | 9/1959 | Bodkin et al. | 188/62 |

*Primary Examiner*—Duane A. Reger
*Attorney*—Thomas I. Davenport, Edward M. Farrell, John D. Sowell, Alford L. Trueax and William R. Nolte

[57] ABSTRACT

This invention pertains to a compression spring supported plate assembly which carries a friction lining for coaction with an arrestment surface and which is supported a predetermined distance away from a movable base structure. The precompression of the springs can be altered to change the brake force, acceleration, independently and without affecting the distance of the brake lining from the base structure. Correspondingly the distance of the brake lining from the base structure to compensate for brake wear can be altered without affecting the precompression of the springs.

2 Claims, 3 Drawing Figures

BRAKE SPRING APPARATUS

This invention relates to brake spring apparatus and more particularly to brake mechanism for performing independent adjustments for brake lining wear, and adjustment for the loading of the lining.

Heretofore in certain prior art mechanisms the loading of brake linings against a reactant arrestment surface has been accomplished by the use of springs which have been precompressed a desired amount to obtain the magnitude of normal loading required. This has been done by mounting a retainer at opposite ends of the springs and connecting them with a bolt. In order to vary the precompression of the springs to alter the loading of the brake lining against the reactant surface the bolt is either tightened or loosened to achieve the desired result. As a result of such adjustment the overall distance between the friction surface of the brake lining and the base structure which carries the precompression assembly is changed. As a consequence, a further adjustment of the entire precompression spring assembly is required to maintain the overall height of the lining relative to the base structure. This sequential double adjustment has proved to be disadvantageous.

Accordingly it is the principal object of this invention to provide an improved brake apparatus which avoids one or more of the disadvantages of prior art devices.

It is another important object of this invention to provide an improved brake apparatus having a brake lining affixed to as assembly of precompression springs supported from a base assembly in which the precompression of the springs and the distance of the lining from the base structure can be independently adjusted.

In accordance with the invention there is provided a plate assembly having an outer and inner plate with bias means therebetween supported adjacent to a movable base structure. Friction means secured to the outer plate means and coactable with a stationary reactive surface are positionable relative to said base structure and reactive surface by first adjusting means. Second adjusting means coactable with said inner plate means are provided to alter the extent of bias of said bias means without affecting the position of said friction means relative to said base structure.

For a better understanding of the invention together with other and further objects thereof reference is had to the following description taken in connection with the accompanying drawing.

This invention has utility in power operated launching systems for aircraft on aircraft carriers of the type illustrated on U.S. Pat. No. 3,504,872 to H.M. Russell-French titled "Sealing Apparatus for Aircraft Catapults," Apr. 7, 1970 and assigned to the same assignee as the present invention.

Figure 1:
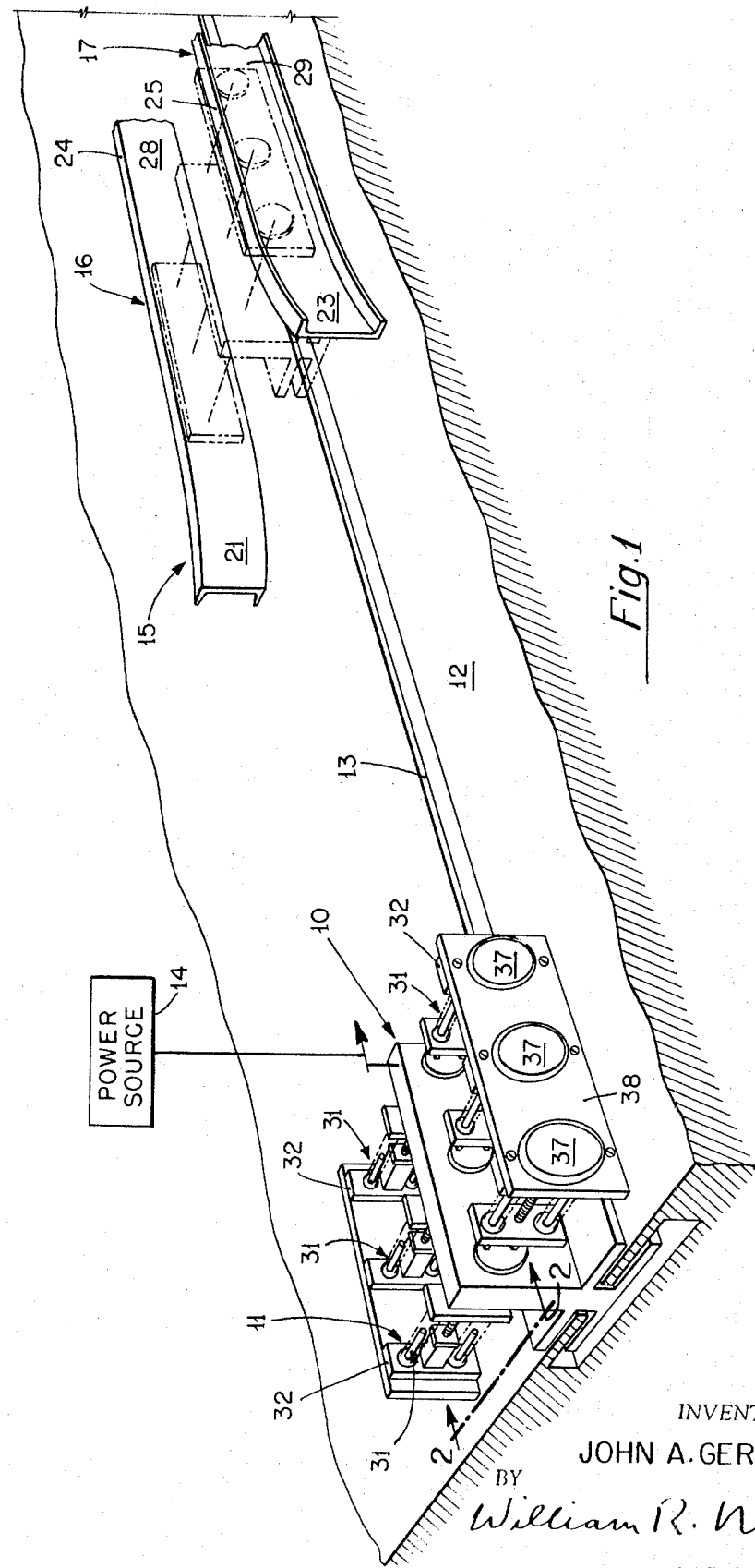
FIG. 1 shows a tracked device adapted to cooperate with an arrestment structure and employing the brake spring apparatus of the present invention.

With reference now to FIG. 1 of the drawing there is shown a base structure 10 employing the brake spring apparatus 11 of the present invention. The base structure 10 includes a lower H configuration mounted for movement along a track 13 in the present instance a slot in deck 12 by means of a suitable source of power 14. The power P is disengaged or removed from the base structure prior to entering the arrestment structure 15. The arrestment structure 15 consists of a pair of upright plate members 16, 17 disposed in spaced relationship on opposite sides of track. The lateral spacing of the plates is such as to coact with the brake spring apparatus 11 of the present invention affixed to side surface 20 of the base structure 11 as the latter moves between the upright plates 16, 17. The plates 16, 17 are flared outwardly at their end portions 21, 23 respectively and are closer together in their parallel remaining portions 24, 25 respectively. The base structure enters the flared end portions of the plates and the brake apparatus 19 affixed thereto engages the inner reactant face surfaces 28, 29 of plates 16, 17 respectively to gradually deaccelerate the base structure 11 as the same travels between the two upright plates 16, 17.

Figures 2, 3:
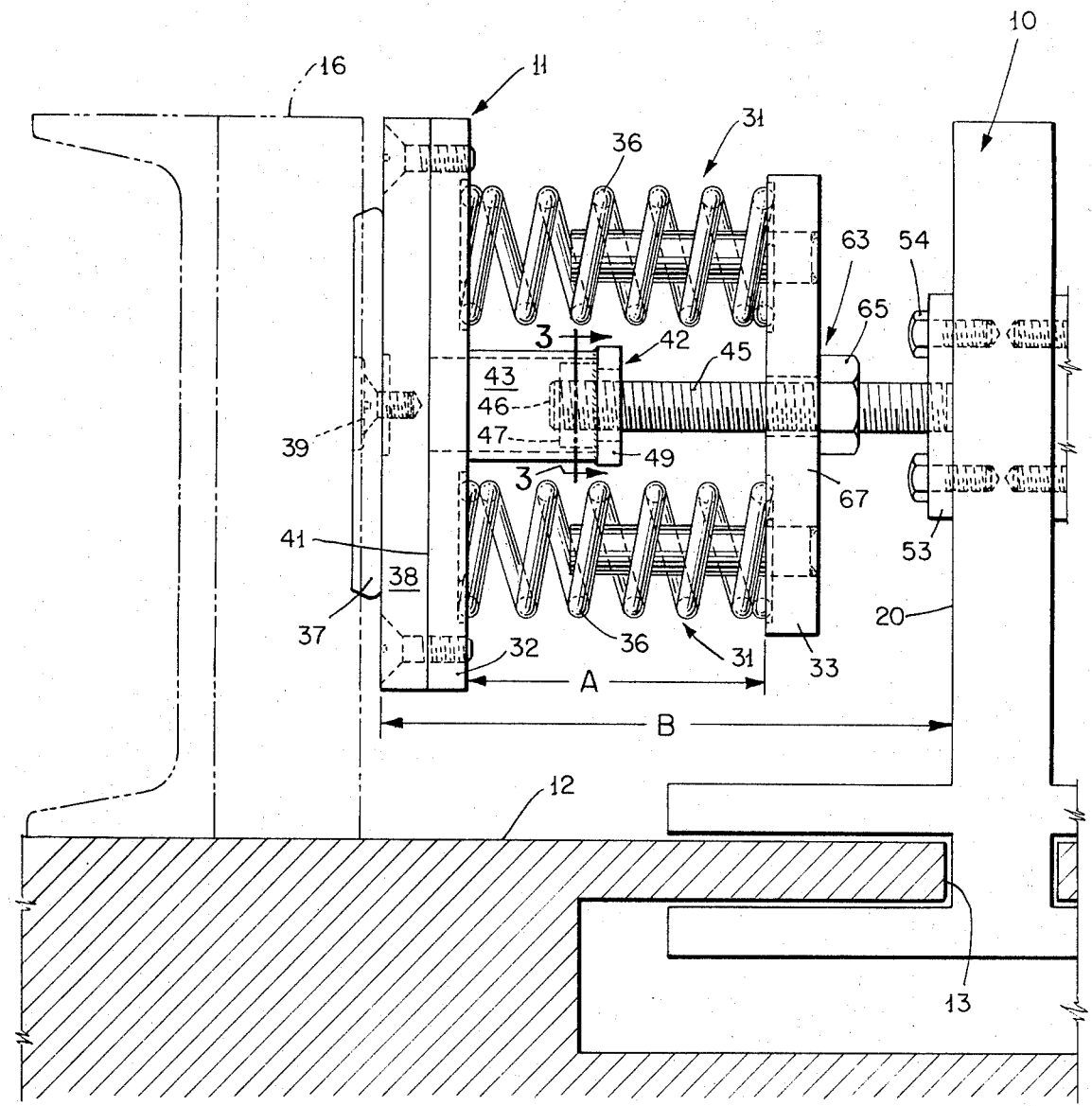
FIG. 2 is a view taken along the lines 2—2 of FIG. 1 of the brake spring apparatus of the present invention.
FIG. 3 is a sectional view taken along the lines 3—3 of FIG. 2.

With reference now to FIG. 2 the brake apparatus 11 of the present invention comprises a plurality of spring assemblies 31 having spaced apart compression spring retainer plates 32 outer, 33 inner, with compression coil springs 36 enclosed therebetween. A plurality of brake lining pads 37 are attached to longitudinally extending plate 38 by means of screws 39. Plate 38 is common to, and is secured to the outer surface 41 of outer retainer plate 32 of each of the spring assemblies 31.

In order to control or adjust the distance B of the brake lining 37 from surface 20 of the base member 11 first adjusting means 42 are provided. For this purpose a sleeve member 43 is suitably affixed to the inner surface 44 of outer retainer plate 32. A threaded rod 45 includes an outer end portion 46 which is received within the sleeve member 43. A nut 47 is secured to the outer end 46 of the rod and is prevented from rotating relative to the sleeve. In the present instance the nut 47 is a square nut and the sleeve 43 includes interior surfaces 48 which matches the faces of the nut so that the nut is enabled to slide along the axis of the sleeve but cannot rotate about said axis. A nut stop 49 is affixed to the bottom of the sleeve 43 and is provided to coact with nut 47 when outer plate 32 is urged outwardly by means of coil springs 36. The inner portion 51 of threaded rod 45 has affixed thereto a bearing plate 53 which is attached by means of screws 54 to surface 20 of base structure 11.

The previously mentioned retainer plate 33 includes a central aperture 57 which enables clearance between it and threaded rod 45. The spring retainer plates 32, 33 confine the coil springs 36 therebetween. Stabilizer elements 60 projecting outwardly from face 61 of plate prevent the coil springs 36 from collapsing or bowing during compression.

In order to control the extent of precompression of the coil springs 36 second adjustment means 63 are provided. For this purpose a nut 65 cooperating with threaded rod 45 and the lower surface 67 of retainer plate 33 controls the extent of inward movement of inner spring retainer plate 33. By rotating nut 65 in one direction and holding the spring retainer assembly plates 32, 33 from rotating, the compression of coil springs 36 can be increased, while turning the nut in an opposite direction the precompression of the springs 36 can be reduced. The nut 47 is prevented from rotating by sleeve member 43. In this manner the distance A between the spring retainer plates is altered without affecting distance B corresponding to the distance of the brake lining pad 37 from surface 20 of the base structure.

With normal usage the thickness of brake lining pad 37 is reduced. As a result it becomes necessary to move the brake lining pad outwardly to compensate for such wear. Under these circumstances it is not desirable to alter the precompression setting of the coil springs 36. Accordingly when it is desired to alter the distance B without affecting distance A corresponding to the precompression setting of the springs, the operator rotates threaded rod 45 while preventing rotation of nut 65 and outer plate 32 which through sleeve 43 retains nut 47 in a captive state. The above operation requires that plate 53 to which threaded rod 45 is affixed be first disassembled from surface 20 of base 11 to enable rotation of rod 45. It is apparent therefore that by so doing the above, the distance A is not altered.

While there has been described what at present is considered to be the preferred embodiment of the invention, it will be obvious to those skilled in the art that various changes and modifications may be made therein without departing from the scope of the invention.

What is claimed is:

1. Brake apparatus cooperable with a reactive surface of an arrestment structure comprising, in combination, plate assembly means, a base structure means supporting said plate assembly means adjacent said base structure, said plate assembly means having first plate means and second plate means with bias means therebetween, friction means secured to said first plate means and coactable with said reactive surface, sleeve means connected to said first plate means and encircling said support means, first adjusting means including nut means captive within sleeve means, said sleeve means carrying said plate means with said friction lining being axially slidable relative to said nut means along said support means in one direction, said sleeve means having retainer means engagable with said nut means to limit movement of said first plate means in an opposite direction, and second adjusting means coactable with said second plate means for adjusting the magnitude of bias means independently of said first adjusting means.

2. Brake apparatus as set forth in claim 1 wherein said support means includes threaded rod means, means mounting said rod means normal to said base structure, said captive nut means being adjustably cooperable with said threaded rod means, said second adjusting means including nut means cooperable with said rod means whereby upon relative rotation of said rod means with respect to said nut means and said captive nut means, the distance of said plate assembly means carrying said friction means from said base structure is altered without affecting the magnitude of bias of said bias means.

* * * * *